United States Patent
Hamilton et al.

(10) Patent No.: US 6,559,860 B1
(45) Date of Patent: *May 6, 2003

(54) METHOD AND APPARATUS FOR JOINING AND MANIPULATING GRAPHICAL OBJECTS IN A GRAPHICAL USER INTERFACE

(75) Inventors: Jeffrey L. Hamilton, Cedarburg, WI (US); Bret D. Schlussman, New York, NY (US)

(73) Assignee: Rockwell Software Inc., West Allis, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/163,929

(22) Filed: Sep. 29, 1998

(51) Int. Cl.[7] ............................................. G09G 5/00
(52) U.S. Cl. .................... 345/700; 345/848; 345/619; 345/649; 345/964
(58) Field of Search ..................... 345/340, 339, 345/326, 433, 420, 437, 700, 764, 848, 852, 619

(56) References Cited

U.S. PATENT DOCUMENTS

| | | | | |
|---|---|---|---|---|
| 5,297,057 A | * | 3/1994 | Kramer et al. ............... | 345/953 |
| 5,367,622 A | | 11/1994 | Coggins ....................... | 345/356 |
| 5,400,246 A | | 3/1995 | Wilson et al. ............... | 364/146 |
| 5,500,926 A | * | 3/1996 | Matsuo et al. ............... | 345/433 |
| 5,511,157 A | * | 4/1996 | Wang ........................... | 345/437 |
| 5,511,158 A | | 4/1996 | Sims ............................ | 395/140 |
| 5,588,098 A | * | 12/1996 | Chen et al. .................. | 345/437 |
| 5,623,418 A | | 4/1997 | Rostoker et al. ............. | 364/489 |
| 5,717,877 A | | 2/1998 | Orton et al. .................. | 395/326 |
| 5,760,786 A | | 6/1998 | Marks et al. ................. | 345/441 |
| 5,767,854 A | * | 6/1998 | Anwar ......................... | 345/355 |
| 5,815,154 A | * | 9/1998 | Hirschtick et al. ........... | 345/420 |
| 5,835,693 A | * | 11/1998 | Lynch et al. ................. | 345/473 |
| 5,844,566 A | | 12/1998 | Lecland et al. ............... | 345/426 |
| 5,859,643 A | | 1/1999 | Iida ............................. | 345/441 |
| 5,861,889 A | * | 1/1999 | Wallace et al. ............... | 345/433 |
| 5,867,399 A | | 2/1999 | Rostoker et al. ............. | 364/489 |
| 5,883,639 A | | 3/1999 | Walton et al. ................ | 345/473 |
| 5,889,528 A | | 3/1999 | Zhao ............................ | 345/436 |
| 5,894,310 A | * | 4/1999 | Arsenault et al. ............ | 345/433 |
| 5,900,870 A | | 5/1999 | Malone et al. ............... | 345/333 |
| 5,988,862 A | * | 11/1999 | Kacyra et al. ................ | 382/195 |
| 5,999,179 A | | 12/1999 | Kekic et al. .................. | 345/349 |
| 6,016,147 A | * | 1/2000 | Gantt ........................... | 345/420 |
| 6,025,841 A | | 2/2000 | Finkelstein et al. .......... | 345/342 |
| 6,040,839 A | * | 3/2000 | Van Eldik et al. ........... | 345/420 |
| 6,067,572 A | | 5/2000 | Jensen et al. ................. | 709/241 |
| 6,078,329 A | | 6/2000 | Umeki et al. ................. | 34/433 |
| 6,144,385 A | | 11/2000 | Girard .......................... | 345/424 |
| 6,232,983 B1 | * | 5/2001 | Felser et al. ................. | 345/649 |

* cited by examiner

Primary Examiner—Kristine Kincaid
Assistant Examiner—Sy D. Luu
(74) Attorney, Agent, or Firm—William R. Walbrun

(57) ABSTRACT

An object-oriented computer environment having a pair of graphical objects displayed on a graphical window of a display screen. The graphical objects are positioned relative to one another in a desired orientation through the use of a user interface. The graphical objects are operatively joined at an anchor point so that movement of one of the graphical objects will correspondingly move the other graphical object joined therewith.

20 Claims, 12 Drawing Sheets

METHOD AND APPARATUS FOR JOINING AND MANIPULATING GRAPHICAL OBJECTS IN A GRAPHICAL USER INTERFACE

BACKGROUND OF THE INVENTION

1. Field of the Invention

The present invention relates generally to computer systems having a graphical user interface. More particularly, the invention pertains to a method and apparatus for defining and connecting graphical objects to one another in an object oriented computing environment.

2. Description of the Prior Art

Graphical user interfaces employing an object-oriented programming paradigm are commonly used in application programs such as word processing and database programs, as well as other graphic desktop applications. A graphical user interface provides manipulable graphical objects such as icons, windows, and various controls that can be used to control underlying software or hardware represented by the graphical objects. Typically, a user interacts with the graphical user interface using a graphical pointer that is controlled by a pointing device, such as a mouse or trackball, to accomplish conventional drag and drop techniques and other graphical object manipulations.

The conventional object-oriented, graphical user interface provides an effective manner to monitor and control underlying components represented by the graphical objects. However, applications that display animation or graphical movement between connected components have required the assistance of computer programmers and specially designed custom software. Examples of such applications are computer simulation programs, mechanical emulation programs, and user display or control applications that graphically display moving components of an automated process. Accordingly, these programs are typically difficult and expensive to develop making them generally unavailable to many industries and possible applications.

As will be described in greater detail hereinafter, the method and apparatus of the present invention solves the aforementioned problems by employing an object oriented paradigm to represent connectable graphical objects and employs a number of novel features that render it highly advantageous over the prior art.

SUMMARY OF THE INVENTION

Accordingly, it is an object of this invention to provide a system and method for connecting and manipulating graphical objects.

Another object of this invention is to provide an improved graphical user interface in a computer system for displaying or monitoring graphical objects.

Still another object of this invention is to provide object dragging and dropping techniques for connecting graphical objects.

Yet another object of this invention is to provide a method and apparatus which can be easily used by systems engineers or designers to provide applications having graphical objects virtually connected to one another in a graphical computing environment without having to rely upon the assistance of computer programmers and specially designed custom software.

To achieve the foregoing and other objectives, and in accordance with the purposes of the present invention a method and apparatus of operatively joining graphical objects are provided. The graphical objects are displayed on a computer display device of a computer system which includes the display device, a processor, and memory for storing the graphical objects.

At least two graphical objects are connected or anchored to one another such that movement of a representation of one of the graphical objects on the display device correspondingly affects the movement of a representation of the other graphical object. In use, the representation of one of the graphical objects will be moved on the display device in response to a value change of a property of that graphical object, where that property is associated with the positioning of the representation of that graphical object on the display device. The representation of any connected graphical object joined therewith will then move automatically so that the representations of the graphical objects preferably emulate a mechanical connection.

In accordance with an aspect of the invention, the graphical objects are displayed by dragging representations of the graphical objects in response to position commands from a user interface coupled with the computer system to position the representations in a desired orientation relative to one another. Each graphical object is connected to another at an anchor point that can also serve as a pivot point to move the graphical object pivotally about the other.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

The present invention generally relates to joining and manipulating graphical objects, as later described, on a computer display screen. The invention may be run on a variety of computers or computing systems including personal computers, mainframe systems, and distributed computing environments.

In the following description, numerous specific details are set forth in order to provide a thorough understanding of the present invention. It will be obvious, however, to one skilled in the art that the present invention may be practiced without many of these specific details. In other instances, well-known structures, circuits, and programming techniques have not been shown in detail in order not to unnecessarily obscure the present invention.

Figure 1:
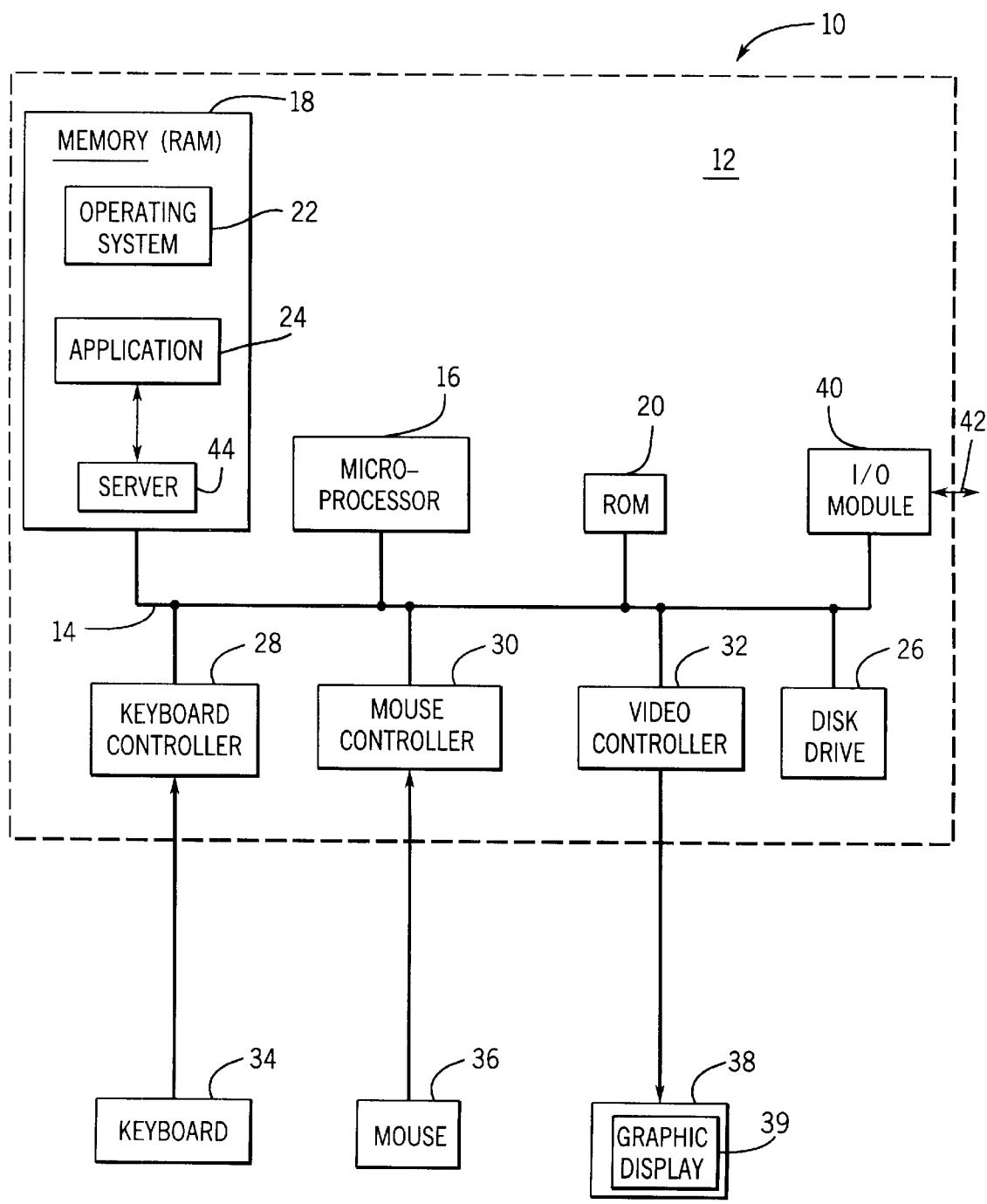
FIG. 1 depicts an exemplary computer system configured according to the teachings of the present invention.

Referring to FIG. 1, a computer system 10 of an exemplary embodiment of the present invention includes a system unit 12. The system unit 12 includes a system bus 14 to which various components are connected and communicate through. Microprocessor 16 is connected to the system bus 14 along with random access memory (RAM) 18 and read only memory (ROM) 20. The Microprocessor can be any number of conventional processors including the Intel PENTIUM microprocessors, IBM POWERPC microprocessors, or others.

The RAM 18 is the main memory of the system 10 while the ROM 20 typically includes the BIOS and other basic operating instructions, data and objects used by the system 12 to perform its functions. The operating system 22 and application program 24, when loaded into the system 12, are typically retained within the RAM 18, though portions may be retained on the disk drive or storage medium 26, such as a hard disk drive or CD ROM. One skilled in the art would appreciate that the storage of application programs may extend over various mediums and that during run time it is not uncommon that an application program or portions thereof may be residing in several mediums at once or may even be distributed across a network in several different systems. The keyboard controller 28, pointer or mouse controller 30 and video controller 32 are connected to the system bus 14 and provide hardware control and interconnection for the keyboard 34, pointer or mouse 36, and graphic display 38 which are connected to respective controllers. The graphic display 38 has a display screen 39 for displaying representations of graphical objects thereon. For discussion purposes herein, it should be understood that reference to displaying a particular graphical object refers to displaying a graphic representation of the graphical object and discussion of same may be used interchangeably. I/O module or interface 40 is connected to the system bus 14 and enables communication over a network 42, as described later in more detail.

The pointer or mouse 36 can be any type of pointing device including, for example, a mouse, trackball, or touch-sensitive pad. The pointer or mouse 36 is well known in the art and is used by a user to generate control signals having two or more dimensions. The control signals are transmitted to the microprocessor 16. For example, movement of the mouse 36 across a surface will generate control signals in an x-axis and y-axis. The mouse 36 further includes one or more buttons or actuators that can be selectively actuated by the user to generate further control signals to the microprocessor 16. The use of the mouse or similar pointer device is described later with respect to the features of dragging and dropping of graphical objects displayed on the display 38. The implementation of dragging and dropping in a windows graphical environment by using the control signals generated by the mouse is well known in the art.

Object oriented programming paradigms and characteristics relating to encapsulation, inheritance, and polymorphism are well known in the computer programming arts. Accordingly, for brevity, various conventional techniques and terminology have been omitted. Further information and details about these subjects, as well as C++ and OLE, may be obtained from "Inside Visual C++" by David J. Kruglinski, 1996, Microsoft Press, and "Inside OLE 2" by Kraig Brockschmidt, 1994, Microsoft Press, both of which are hereby incorporated by reference.

Figure 2:
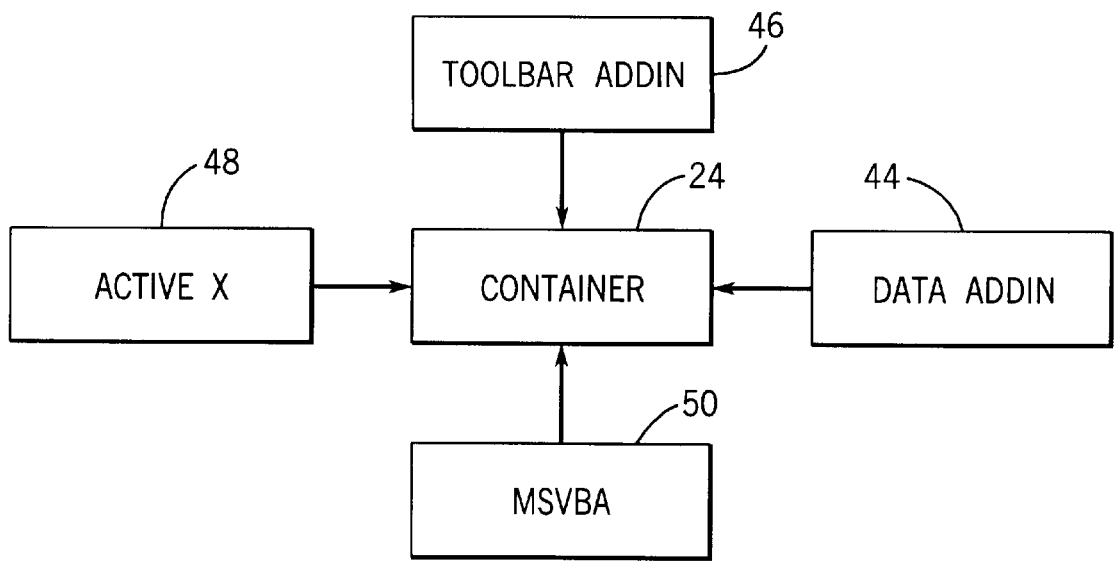
FIG. 2 is a block diagram of one preferred container application according to the teachings of the present invention.

Referring to FIG. 2, the application 24 in a preferred embodiment is a container application written in C++ capable of managing the graphical objects described below. The container application 24 includes a server application or data addin 44 that manages the data of the graphical objects as later described. Additionally, toolbar addins 46, ActiveX controls 48, and Microsoft Visual Basic Application (MS VBA) 50, all of which are known in the art, are preferably incorporated into the container application 24 to provide additional functionality, usable tools or ease of programmability. It is significant to note that various exemplary and preferred embodiments of the present invention will be described by the C++ programming language, however one skilled in the art would appreciate that other object models and techniques can be defined using other programming languages.

Graphical Objects

Figure 3:
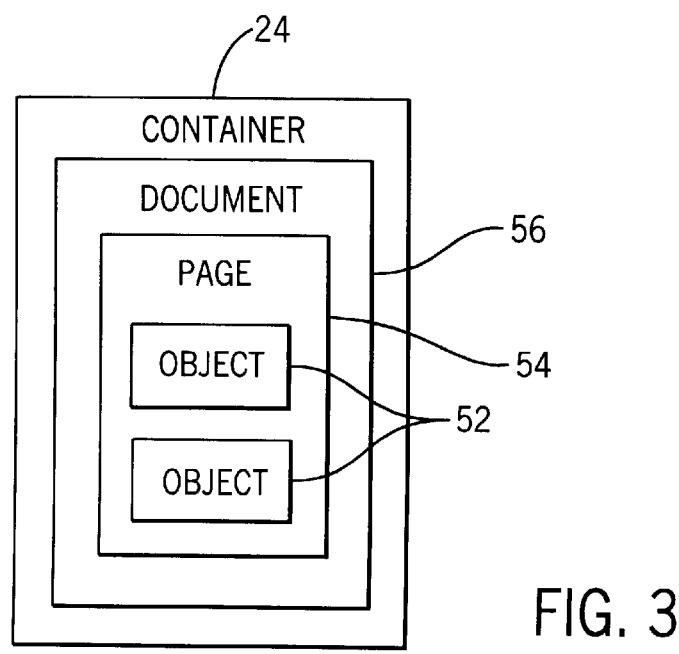
FIG. 3 is a block diagram of the container application depicting its hierarchical structure.

Referring to FIG. 3, the hierarchy structure of the container application 24 is represented. Graphical objects 52 are placed on a graphical page 54, where the page 54 is part of a document 56. In some cases the page is the document, or there is no distinction between a document and the pages in the document.

Figure 4:
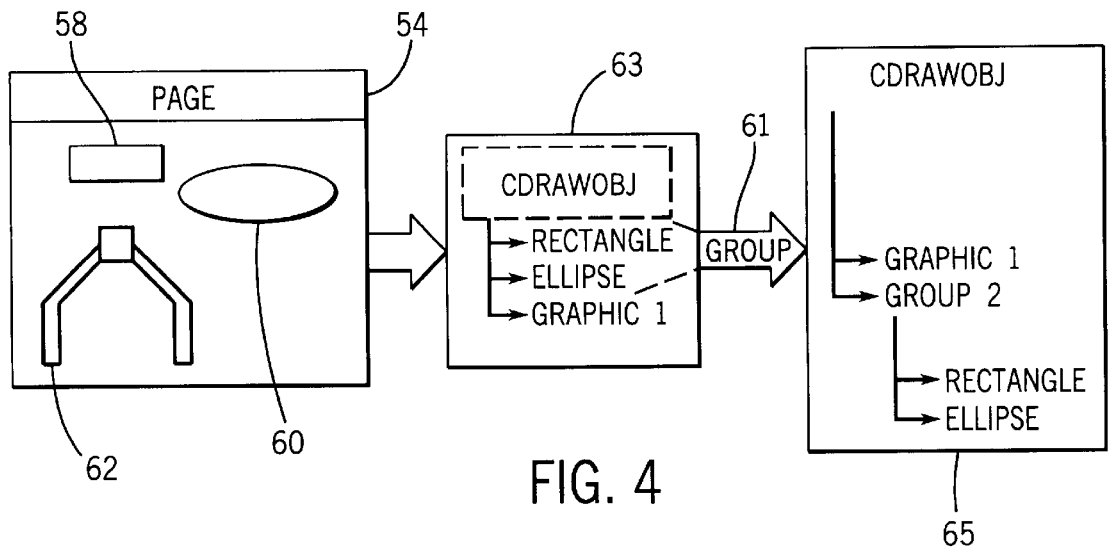
FIG. 4 depicts a grouping function for objects.

Referring to FIG. 4, page 54 of the container application comprises a data structure CDRAWOBJ. All primitives, such as text, rectangles, arcs, ellipses, polygons, and graphical objects are derived from CDRAWOBJ. For illustrative purposes, page 54 includes a rectangle 58, ellipse 60, and graphic 62. As a data structure, each are represented as CDRAWOBJ. When performing a group function 61 on any number of CDRAWOBJs a new CDRAWOBJ is thereby defined as a group having children defined by the selected group items. Window 63 illustrates CDRAWOBJs 58, 60 being grouped into CDRAWOBJ Group 2, shown in window 65, having rectangle 58 and ellipse 60 as children. Further groups of still other groups can be grouped to create CDRAWOBJs that could include hundreds or any desired number of primitives. It should be understood that windows 63, 65 are for illustrative purposes to depict the grouping function and do not correspond to visual or graphical display windows.

Once grouped, a graphical object is formed. It should be noted that the graphical objects will also be referred to herein simply as objects. A graphical object is typically a collection of object primitives. Whatever happens to a graphical object or parent graphical object, as a group, occurs to all its children. In the preferred embodiment, each graphical object is defined as follows:

CDrawObj
    CRectObj
    CTextObj
    CPolyObj
    CProgrammable
        CComplexObj
        CActiveXObj The CRectObj is an object defining a rectangle. The CTextObj is an object defining a text-based box or window and CPolyObj is an object defining a polygon type shape.

The CRectObj, CTextObj and CPolyObj are configured similarly to those corresponding objects that one would find independently in Windows C++ programming or through the use of MS VBA.

CProgrammable is an object that includes anchor, spin, and rotation attributes to the CDrawObj and will be described later in more detail. CProgrammable includes CComplexOBj which is an array of CDrawObjs that provides the ability and complexity of allowing the CDrawObj to be comprised of other CDrawObjs or groups thereof. The functionality of CProgrammable with respect to anchor, spin or rotation is an important part of the present invention. In another embodiment, for example, the CDrawObj graphical object could comprise only one or more of these CProgrammable elements without the other text or geometric based objects.

Graphical Object Properties

Figure 5:
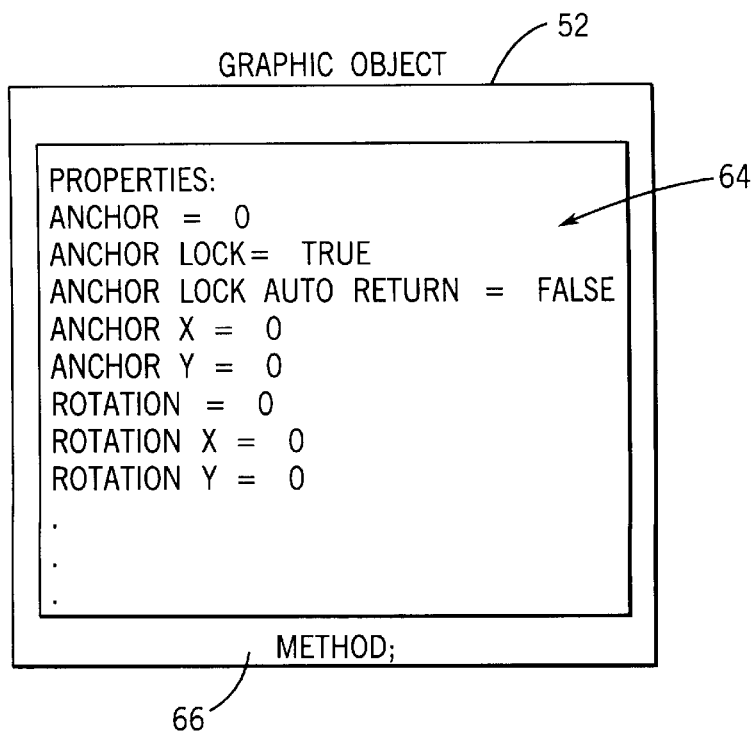
FIG. 5 depicts a preferred embodiment of a graphical object.

Each graphical object 52 includes properties 64 and may also include methods 66, as represented in FIG. 5. The functionality of the Anchor, AnchorLock, AnchorLockAutoReturn, AnchorX, AnchorY, Rotation, RotationX and RotationY properties serve an important role in one preferred embodiment of the present invention where the application of same is used for mechanical emulation purposes later described. In alternative embodiments, one or more of these properties will be provided to serve the emulation or movement characteristics of a particular application. The functionality of these properties 64, along with an exemplary syntax are described below.

The Anchor property specifies the angle, in degrees, that an object can move relative to its anchor point. Its exemplary syntax is shown as:

Object.Anchor [=double]

where the Object is a required portion corresponding to the graphical object being evaluated and the double portion is an optional numeric value expressing degrees. Preferably, this value is in the range of 0 to 360 degrees.

The AnchorLock property specifies whether the anchored object maintains its original angle while rotating with its parent object. Its exemplary syntax is shown as:

Object.AnchorLock [=boolean]

where the Object is a required portion corresponding to the graphical object being evaluated and the boolean portion is an optional boolean expression that specifies whether to lock an anchor point. With the setting of the boolean to true, the anchored object's angle changes relative to its parent object. With the setting of the boolean to false, the anchored object maintains its original angle as it rotates with its parent object.

The AnchorLockAutoReturn property returns the value of the Anchor property to its original design value. Its exemplary syntax is shown as:

Object.AnchorLockAutoReturn [=boolean]

where the Object is a required portion corresponding to the graphical object being evaluated and the boolean portion is an optional boolean expression that specifies whether to reset the original value of the Anchor property. With the setting of the boolean to true, the anchor point position is reset to its original value. With the setting of the boolean to false, the anchor point position remains at its current value.

The AnchorX property specifies the horizontal distance between the center of the object and its anchor point. Its exemplary syntax is shown as:

Object.AnchorX [=double]

where the Object is a required portion corresponding to the graphical object being evaluated and the double portion is an optional numeric expression specifying distance. The AnchorX property is expressed in twips. If the AnchorX value is positive, the anchor point is set to the right of the object's center point. If the AnchorX value is negative, the anchor point is set to the left of the object's center point. If the object is spun or rotated, or its anchor is moved, the AnchorX value of the object changes accordingly.

The AnchorY property specifies the vertical distance between the center of the object and its anchor point. Its exemplary syntax is shown as:

Object.AnchorY [=double]

where the Object is a required portion corresponding to the graphical object being evaluated and the double portion is an optional numeric expression specifying distance. The AnchorY property is expressed in twips. If the AnchorY value is positive, the anchor point is set below the object's center point. If the AnchorY value is negative, the anchor point is set above the object's center point. If the object is spun or rotated, or its anchor is moved, the AnchorX value of the object changes accordingly.

The Rotation property specifies the degree of rotation of an object around its center. Its exemplary syntax is shown as:

Object.Rotation [=double]

where the Object is a required portion corresponding to the graphical object being evaluated and the double portion is an optional numeric expression specifying degree of angle. In a preferred embodiment, the value of the Rotation property can only be set during runtime. The Rotation property is expressed in twips and the value of this property changes as the object is moved left or right by the user or by code. Preferably, this value is in the range of 0 to 360 degrees.

The RotationX property specifies the distance between the center of the object and its rotation point. Its exemplary syntax is shown as:

Object.RotationX [=double]

where the Object is a required portion corresponding to the graphical object being evaluated and the double portion is an optional numeric expression specifying distance. The RotationX property is expressed in twips. If the RotationX value is positive, the rotation point is set to the right of the object's center point. If the RotationX value is negative, the rotation point is set to the left of the object's center point. If the object is spun or rotated, or its rotation point is moved, the RotationX value of the object changes accordingly.

The RotationY property specifies the distance between the center of the object and its rotation point. Its exemplary syntax is shown as:

Object.RotationY [=double]

where the Object is a required portion corresponding to the graphical object being evaluated and the double portion is an optional numeric expression specifying distance. The RotationY property is expressed in twips. If the RotationY value is positive, the rotation point is below the object's center point. If the RotationY value is negative, the rotation point is set above the object's center. point. If the object is spun or rotated, or its rotation point is moved, the RotationY value of the object changes accordingly.

To add further functionality, a graphic object may also include any of the additional properties as follows: BackColor( ) as Color, returns or sets the background color of a graphic; ForeColor( ) as Color, returns or sets the foreground color of a graphic; Height( ) as Double, returns or sets the dimensions of a graphic; HsliderEnd( ) as Double, returns or sets the horizontal end position of a graphics slider of the type known in the art; HsliderEndValue( ) as Double, returns or sets the maximum value of the graphics slider; HsliderMouseEnabled( ) as Boolean, returns or sets a value indicating whether the graphics slider is enabled; HsliderStart( ) as Double, returns or sets the horizontal start position of the graphics slider; HsliderStartValue( ) as Double, returns or sets the minimum value of the graphics slider; HsliderSteps( ) as Double, returns or sets the amount of change to the HsliderValue property setting when the user clicks the area between the scroll graphic and the Hslider-End property; HsliderValue( ) as Double, returns or sets the current position of the scroll bar, whose return value is between the values for the HsliderEndValue and Hslider-StartValue properties; Left( ) as Double, returns or sets the distance between the internal left edge of a graphical object and the left edge of its container; Spin( ) as Double, returns or sets the rotation angle from the center of the graphical object; Top( ) as Double, returns or sets the distance between the internal top edge of a graphic and the top edge of its container; Visible( ) as Boolean; returns or sets a value indicating whether a graphical object is visible or hidden; VsliderEnd( ) as Double, returns or sets the vertical end position of the graphics slider, VsliderEndValue( ) as Double, returns or sets the maximum vertical value of the graphics slider; VsliderMouseEnabled( ) as Boolean, returns or sets a value indicating whether the graphics slider is enabled; VsliderStart( ) as Double, returns or sets the vertical start position of the graphics slider; VsliderStartValue( ) as Double, returns or sets the minimum vertical value of the graphics slider; VsliderSteps( ) as Double, returns or sets the amount of change to the Vslider-Value property setting when the user clicks the area between the scroll graphic and the VsliderEnd property; VsliderValue( ) as Double, returns or sets the current position of the scroll bar, whose return value is between the values for the VsliderEndValue and VsliderStartValue properties; and Width( ) as Double, returns or sets the dimensions of a graphical object.

Anchor Partners

A graphical object may be composed of several other objects anchored together. When one of the several other objects is rotated or moved, it is necessary to execute a process in which the other connected objects are informed of the move and are also moved in accordance with the manner of connection. In a preferred embodiment, this functionality is achieved by a process that scans all aspects of the connections of an object to form a collection. Whenever an action is performed on one part or child of a parent object, that same action is broadcast through the collection of objects that make up that one object. In the preferred embodiment illustrated in FIG. 6, a method referred to herein as AddAnchorPartners performs this function to quickly find all aspects of the relationships to construct the action collection. Using C++ pseudocode, the method definition of AddAnchorPartners is depicted below.

```
void CProgrammable::AddAnchorPartners(CDrawObjList& olSelection,
BOOL
bChildrenOnly, CDrawObjList* olNonRigidParents )
```

It should be understood that all of the C++ pseudocode examples herein could be written in other languages. Further, in the programming arts there are numerous ways that the functionality of object anchoring could be implemented, such as by using different data structures, alternative object linking procedures, lookup tables or linked lists.

Figure 6:
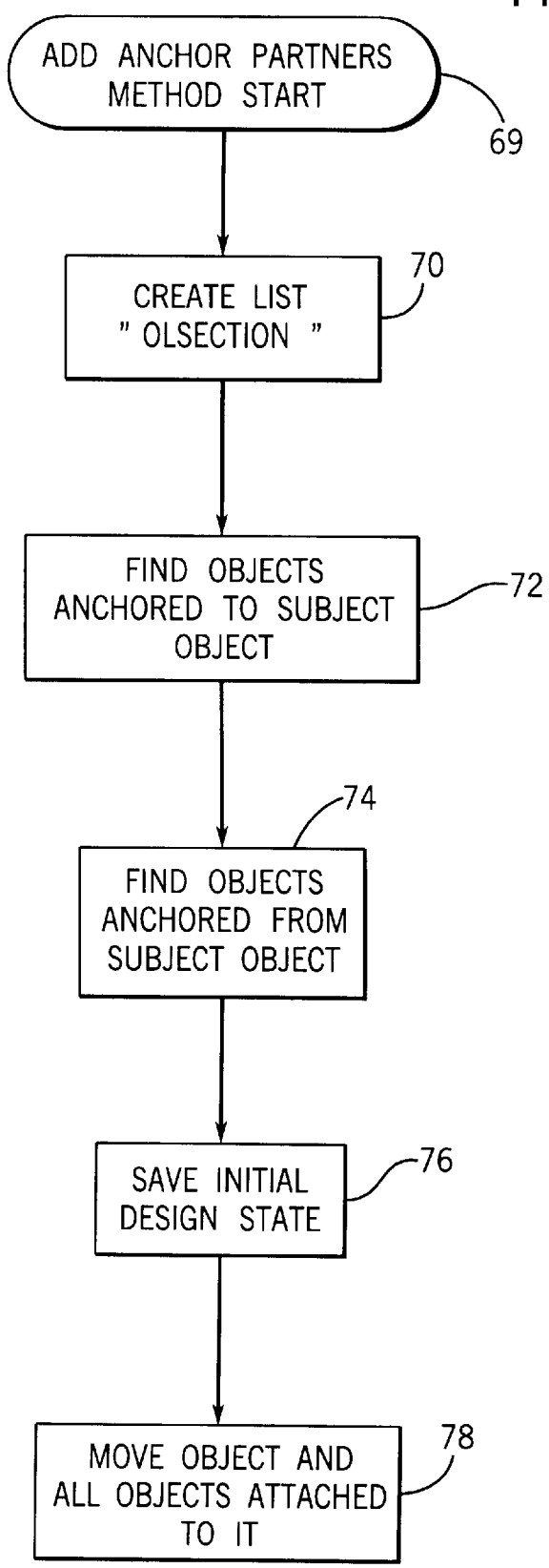
FIG. 6 is a flow diagram of graphical object processing.

The olNonRigidParents provides a list of items that are connected to an object where the AnchorLock property is turned off. The data structure olSelection provides the list of attached objects in the exemplary embodiment. Referring to FIG. 6, AddAnchorPartners is the method, starting at step 69, to create the olSelection list, which is depicted at step 70. This list is created by reviewing the anchoring relationship defined in each object in relationship to the object being acted on.

The list olSelection can be built as follows:

```
CDrawObjList olselection;
olSelection.AddTail (this);
AddAnchorPartners (olSelection);
```

The AddTail function used above adds a new object into a collection at the end of the list. In the preferred embodiment described herein, rigid partners refers to two objects anchored together. The one object that is anchored to another has its AnchorLock flag set to True. If the AnchorLock property of an object is set to True, then it is considered rigid. If it is set to False, it is considered nonridig. Movement of rigid and nonrigid objects with respect to the AnchorLock property occurs differently as will be described later in further detail.

To find the objects anchored to a particular object at step 72, depicted below is C++ pseudocode illustrating an example thereof.

```
if( m_pAnchorTo && (!bChildrenOnly) )
{
    if (olNonRigidParents==NULL)
    {
        if ( !olSelection.Find(m_pAnchorTo) )
        {
            // not in selection
            olSelection.AddTail (m_pAnchorTo);
            m_pAnchorTo->AddAnchorPartners (olSelection,
bChildrenOnly, olNonRigidParents);
        }
    } else
    {
        // only add rigid object
        if (m_bAnchorLock)
        {
            if ( !olSelection.Find(m_pAnchorTo) )
            {
                // not in selection yet
                olSelection.AddTail(m_pAnchorTo);
                m_pAnchorTo->
AddAnchorPartners (olSelection, bChildrenOnly, olNonRigidParents);
            }
        } else
        {
            // not rigid! just collect
            if ( !olNonRigidParents->Find(m_pAnchorTo) )
            {
                olNonRigidParents->AddTail(m_pAnchorTo);
            }
        }
    }
}
```

To find the objects anchored from a particular object at step 74, depicted below is C++ pseudocode illustrating an example thereof.

```
// check for children
int cnt = m_arAnchorFrom.GetSize ( );
for (int i=0; i<cnt; i++)
{
    if (olNonRigidParents==NULL)
    {
        // traditional implementation, collect everything
        if ( !olSelection.Find(m_arAnchorFrom[i]) )
        {
            // not in selection yet
            olSelection.AddTail(m_arAnchorFrom[i]);
            m_arAnchorFrom[i]->
AddAnchorPartners(olSelection, bChildrenOnly, olNonRigidParents);
        }
    } else
    {
        // only add rigid children
        if(m_arAnchorFrom[i]->m_bAnchorLock)
            if ( !olSelection.Find(m_arAnchorForm[i]) )
            {
                // not in selection yet
                olSelection.AddTail(m_arAnchorFrom[i]);
                m_arAnchorFrom[i]->
AddAnchorPartners(olSelection, bChildrenOnly, olNonRigidParents);
            }
        } else
        {
            // not rigid! just collect
            if( !olNonRigidParents->Find(m_arAnchorFrom[i])
}
            {
                olNonRigidParents->
AddTail (m_arAnchorFrom[i]);
            }
        }
    }
}
```

In the user interface described later, when a user links two objects, the user will, have selected a first object and a second object. After actuating the linking or anchoring process, the first object's m_pAnchorTo is set with the second object, and the first object is added to the second object's m_arAnchrorFrom collection. It should be appreciated that any number of objects could be anchored to one particular item. Accordingly, it should be understood that in the foregoing pseudocode that m_arAnchorFrom[i] refers to the i'th object in the collection.

As previously discussed, once the connection tree is stored in a collection, the appropriate operations or movements on the sub-parts or objects of a complex object can be performed. Through the use of recursion, the ability to reach the finite atomic object is accomplished. When moving an object, as described later in further detail, all the objects anchored to it are moved accordingly.

In one preferred embodiment, before performing operations on these objects, the initial design state of the objects is saved at step 76. When an object is rotated, its true shape or definition is lost over time by the action performed on it due to mathematical round-off. To speed up operations when a screen is repainting, the information that makes up a shape is transformed, but its initial design state is saved so that the object will not lose its true appearance as numerous operations are performed on it. This step is depicted below in C++ pseudocode.

```
pos = olSelection.GetHeadPosition( );
while(pos)
{
    pC = (CProgrammable*) olSelection.GetNext(pos);
    if( !pC->m_bWasDesignStateSaved)
    {
        pC->SaveDesignstate( );
        pC->m_bWasDesignStateSaved = TRUE;
    }
}
```

After the design state has been saved, various rotate, spin, and movement functions can be performed to the objects at step 78. The application of these motion functions by themselves for a single unconnected object is known in the art. However, any such movement of an object of the present invention will then require corresponding movement to anchored objects. This is achieved by utilizing the anchor partner functionality previously described so that the movement is broadcast to each anchored object for effectuating a movement that corresponds to the connection therebetween. For example, when an object spins, its position will also move. Accordingly, a calculation of how the object has moved is made and all objects attached to this object are offset by the calculated number of pixels.

In summary, one embodiment of the foregoing method of manipulating and displaying graphical objects on the computer display device of the system includes the step of first creating a graphical object in an object-oriented environment and storing the graphical object in the memory of the computer system. The graphical object may be comprised of a plurality of child graphical objects where the graphical object and each of the child graphical objects has at least one property corresponding to the orientation of a representation of the respective graphical object, such as the Anchor property. Next, the graphical object is scanned by traversing through each of the child graphical objects to form a connection tree having initial values of each property of the respective graphical objects. The connection tree being preferably stored in the memory of the system. In operation, a value of the property of the graphical object will become altered from the initial value which corresponds to a change in the position of the representation of the graphical object. The representation of the graphical object will be graphically displayed on the display device by traversing through the connection tree to broadcast the altered value of the graphical object to each of the child graphical objects, recalculating the value of each property of the child graphical objects based on its initial value and the altered value of the graphical object, and displaying the representation of the graphical object including its child graphical objects on the display device with the recalculated values.

Persistence

During operation of the system as previously described, it will be appreciated that the various graphical objects created will change positions relative to one another. When ending a presently running program or application, the graphical objects and the values of their present properties can be retained in the conventional manner of saving the various information to disk. However, the data structures of the graphical objects include linked lists. The pointers of these linked lists existing at the time the application or program is running are not saved to disk. Without this information, objects later reloaded and reassembled would not have the proper orientation of their graphical representations.

Figure 7:
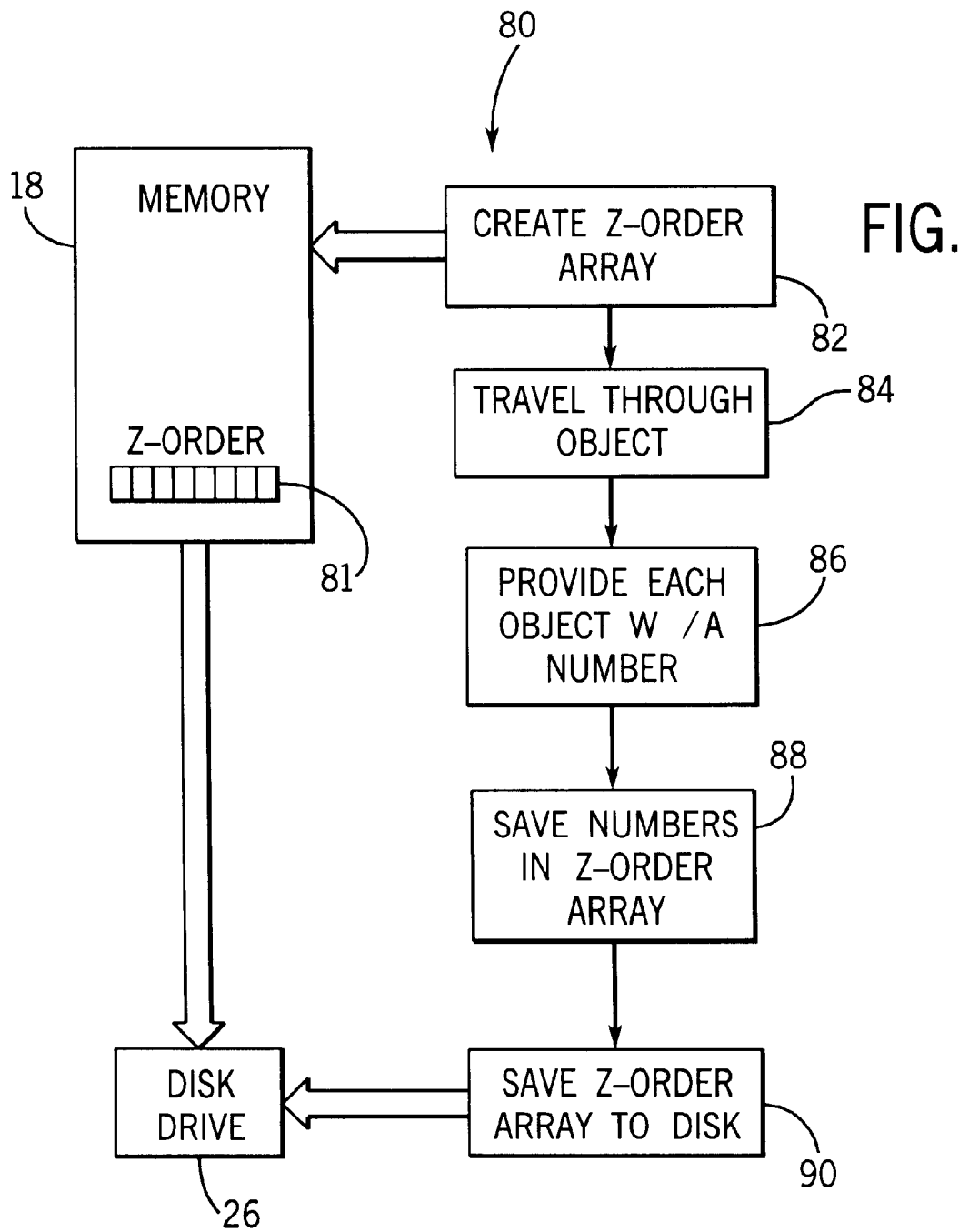
FIG. 7 depicts persistence of the objects according to the teachings of the present invention.

In a preferred embodiment illustrated in FIG. 7, persistence 80 is accomplished by creating a Z-order property of a graphical object. Persistence refers to the permanence of an object, that is, the amount of time for which it is allocated space and remains accessible in the system's memory. When the object is reloaded, individual segments of the object are reassembled accordingly. At step 82, a Z-order array 81 is created and stored in memory 18. When the present state of the graphical objects are to be retained, each graphical object is traversed at step 84 and is provided at step 86 with an indexing number. At step 88, the numbers are saved in the Z-order array 81 which provide the numerical index based on the Z-order. At step 90, the Z-order array 81 is stored to disk drive 26 or other storage medium.

Server and Networking

The server or data addin 44 is in communication with the network 42 (FIG. 1) to read and write data across the network 42 to a particular node, which may be another device, processor, etc. Further, the server moves the data into the container application to update particular variables with new or changed values. The server 44 can be a separate application or interface coupled with the container application internally or remotely. Alternatively, the two applications could be integrated together. As later described, the server in one embodiment updates the values in the Anchor or Rotation properties to provide mechanical emulation.

Figure 8:
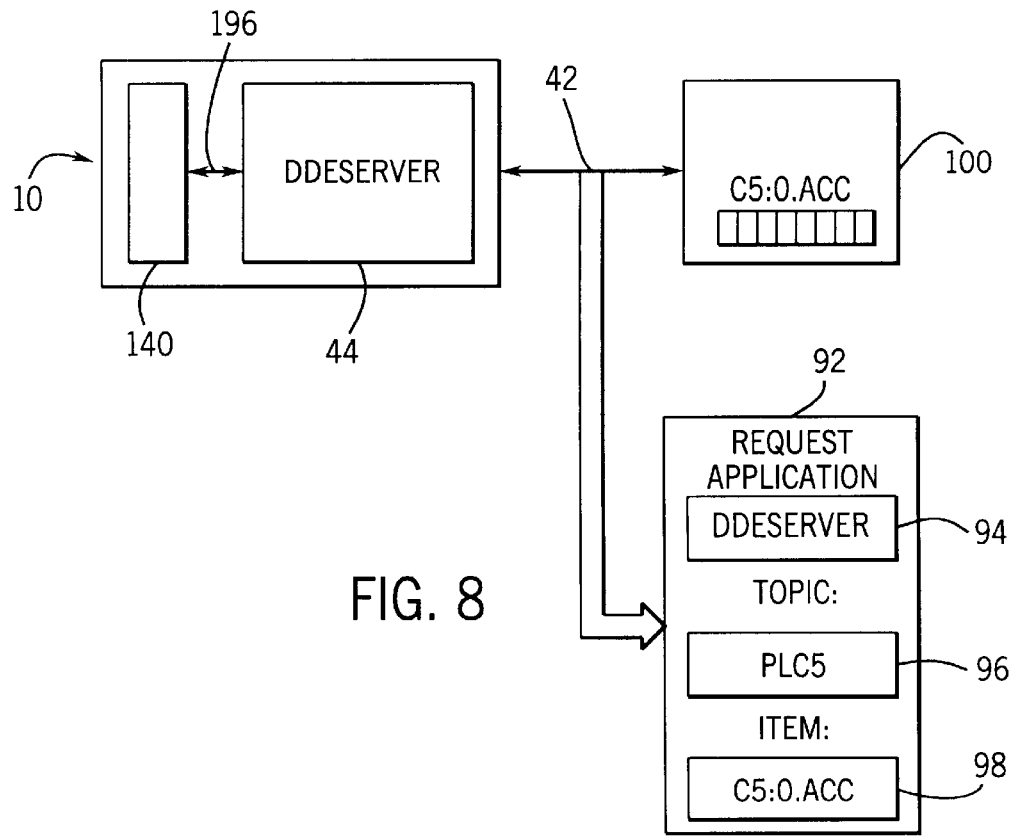
FIG. 8 is a block diagram of one preferred embodiment of server communication.

In one embodiment shown in FIG. 8, the server communicates through Dynamic Data Exchange (DDE) and maintains the connection with the communication network. The server uses DDE request strings 92 to access information. The DDE request string, graphically depicted in FIG. 8, is formed of three elements including the application 94, topic 96, and item 98. The application 94 identifies the source of the request. The topic 96 identifies the device to be communicated with and the item 98 is the name of the particular address for which a value is to be returned. For example, a DDE request having an application name DDESERVER, a topic name PLC5, and an item C5:0. ACC, corresponds to returning the value stored in address C5:0. ACC of PLC5 100 to the server DDESERVER 44'.

It should be appreciated that the server could be configured in a number of manners. The server could include a separate processor operating remote from the container application with the information being transferred across the communication lines. Additionally, the server could be software based, such as RSLinx™ produced by Rockwell Software, Inc. of West Allis, Wis., installed within the same computing device that is operating the container application along with an associated I/O module or card of conventional type. As a further example, the server could be an OLE for Process Control (OPC™) server which provides a standardized mechanism to provide data from a data source, communicate the data to an application, and update the data therebetween.

Figure 9:
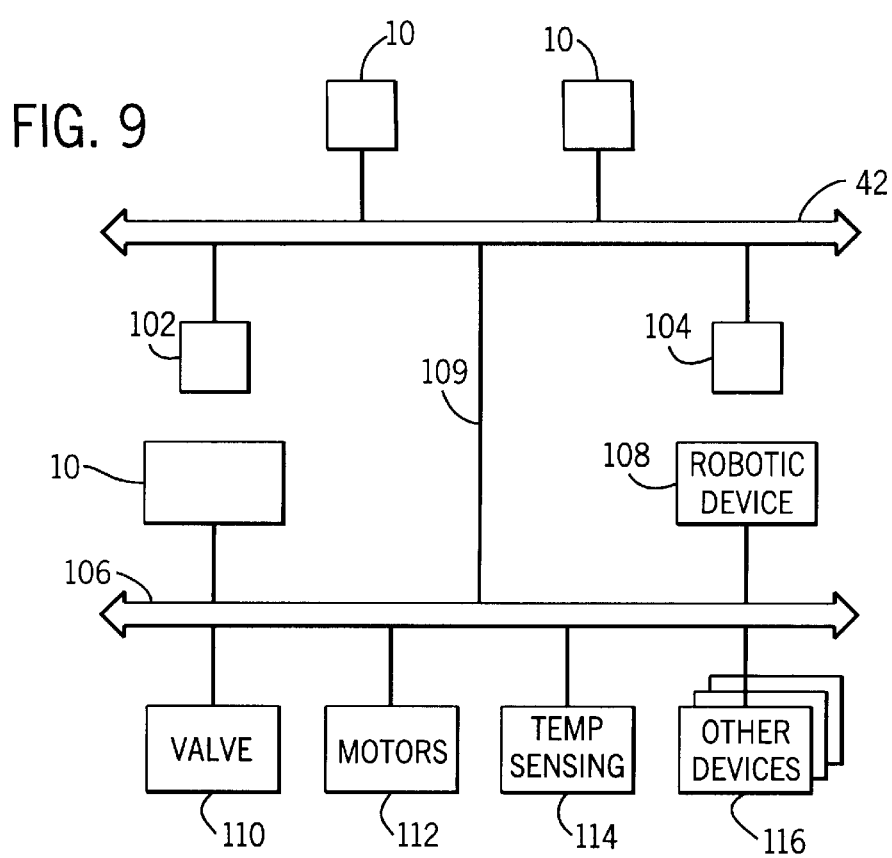
FIG. 9 is an exemplary embodiment of a communication network connected with remote devices.

An exemplary communication network of conventional design is implemented herein. The choice of network will be typically based on the type of system application. In FIG. 9, a ControlNet™ network, produced by the Allen-Bradley Company, LLC of Milwaukee, Wis. is illustrated. The ControlNet™ network meets the demands of real-time, high-throughput applications and is well-suited for industrial automation applications where the network will be linked to PLC processors, I/O, computers, and other devices or networks. For example, in this exemplary embodiment, the network 42, such as the ControlNet™ network, is connected with other computer systems 10 or programmable logic controllers 102. The network 42 may be directly connected with an automation system or device 104 or may be further connected to another network 106 or system. Shown in the FIG. 9, the network 106 is DeviceNet™ Network, produced by the Allen-Bradley Company, LLC of Milwaukee, Wis. The network 106 is connected to network 42 through line 109 in the embodiment shown here. The network 106 is connected with various devices which may include a machine or robotic device 108, valve 110, motor 112, sensor 114, or other devices or components 116. It should be understood that the particular configuration will vary depending on the application.

Figure 10:
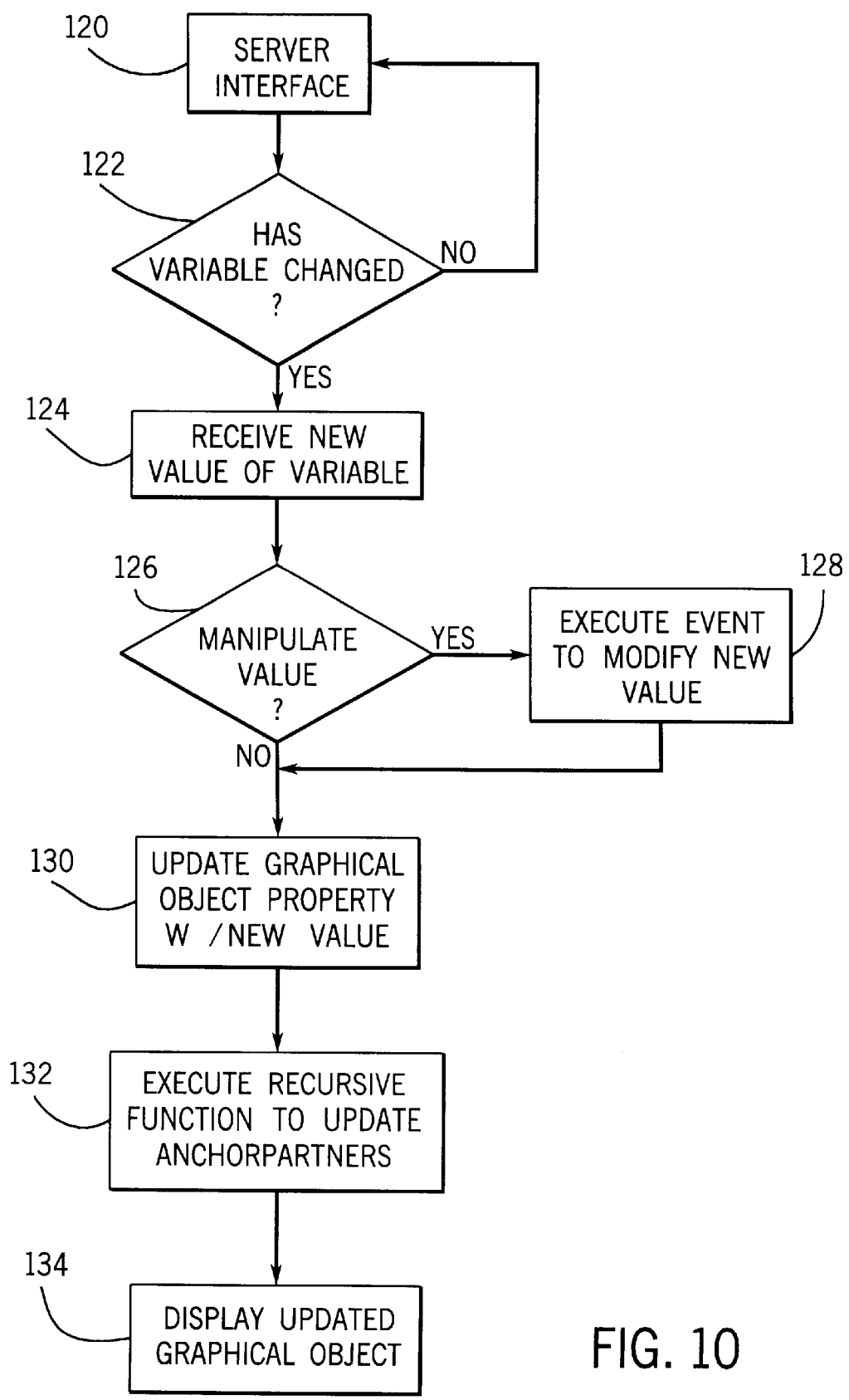
FIG. 10 is a flow diagram of one preferred embodiment of data transmission through the server.

In an industrial automation or other time-sensitive applications, the representations or graphical images of the graphical objects are updated in substantially real-time to reflect the changes in position attributes which are represented as values of particular variables. Referring to FIG. 10, the server operates independently from the container application to maintain communication with the network and to update any changed values of the properties, as previously discussed. At step 120, the server operates with a conventional interface technique, such as one operating through DDE, OPC™ or Component Object Model (COM) interface. At the step 122, the interface monitors the condition of the variable to detect a change. If a change occurs, the server will receive the new value of the variable at step 124. If at step 126 the value is to be manipulated for any purpose, then such action occurs at step 128 by executing code residing in a corresponding graphical object in the form of an event that is triggered. For example, the value as received from the server may exist in raw data form that must be processed by the event. In other cases, the value may need to be properly scaled for use in the parameter range that has been.previously set for the corresponding property. At step 130, the corresponding property is updated with the new or modified value. A recursive function is executed at step 132 to update the anchor partners, described later in more detail. The representation of the graphical object is updated on the display screen at step 134 to reflect the most recent change.

Figure 11:
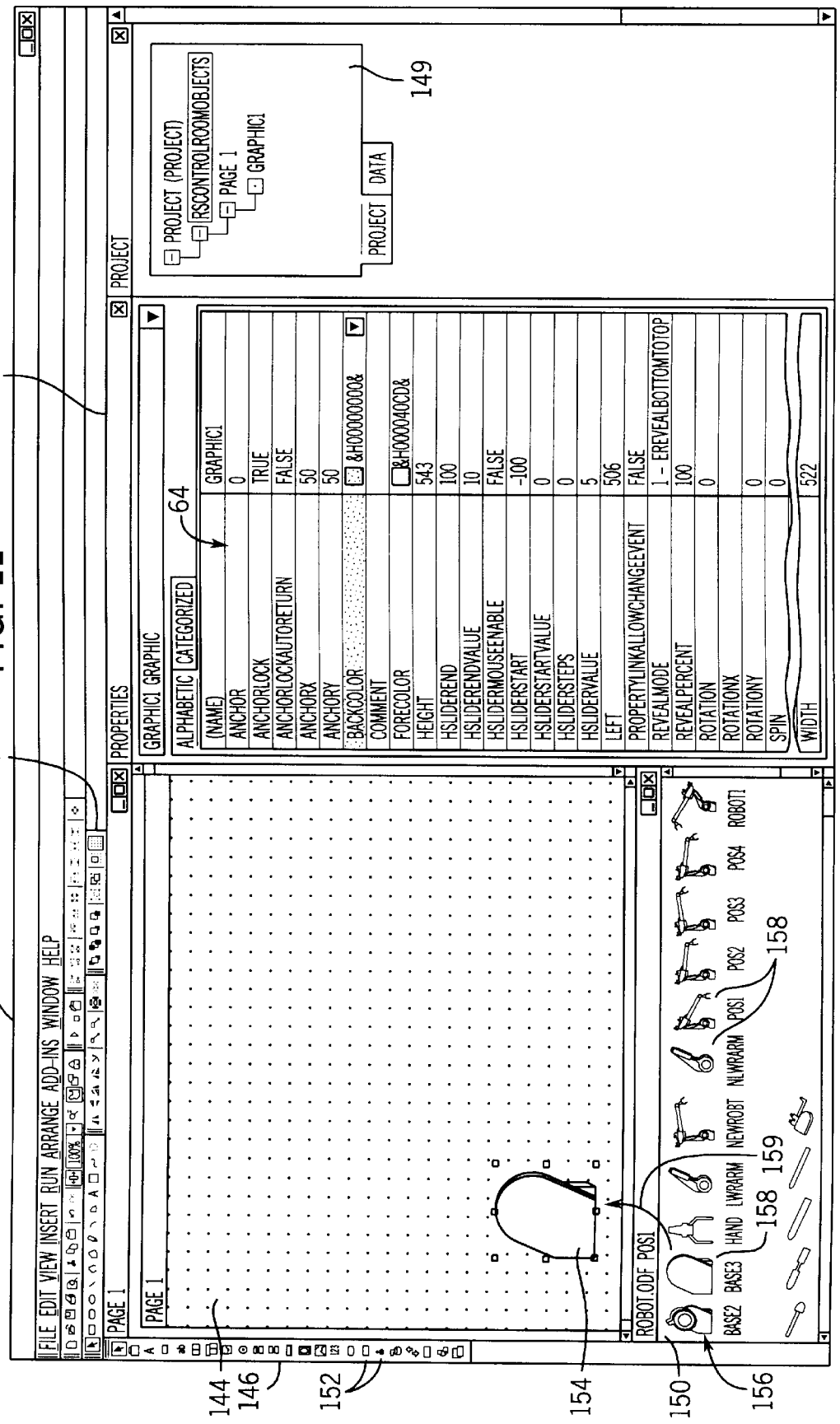
FIGS. 11–15 depict graphical interface screens of a preferred embodiment according to the teachings of the present invention.

Referring now to FIG. 11, a graphical user interface 140 of a preferred embodiment is provided. The interface 140 is generated by the container application 24 on the display screen 39 previously described. The interface 140 incorporates the interface for the MS VBA 50 and accordingly has a similar look and feel. However, the interface 140 includes its own menus, toolbars, and other user interface components and functionality as will be described below.

The interface 140 illustrated in FIG. 11 includes a toolbar 142, a document or page window 144, a toolbox window 146, a properties window 148, a project explorer window 149, and library window 150. The toolbox window 146 displays icons 152 that represent types of objects that a user can place on the page window 144. These objects include ActiveX controls 48 (FIG. 2) and those of the RSTools program which was developed and is sold by Allen-Bradley Company, LLC, the assignee of the subject patent application.

The properties window 148 displays all the properties for a selected object. For example, the properties window 148 shown in FIG. 11 is displaying the properties 64 for Graphic1 154 which is a graphical object 52. The graphical representation of Graphic1 154 is displayed on the page window 144. In the present exemplary embodiment, Graphic1 154 was placed on the page window 144 by first opening a graphical object library 156 having a series of preformed graphical objects 158 shown within the library window 150. One of the preformed graphical objects 158, such as Base 3, was selected by the user and dragged and dropped with the pointing device or mouse 36 (FIG. 1) on the page window 144 in a desired location or orientation indicated by arrow 159.

The project explorer window 149 displays a hierarchical list of the currently open projects and its contents. In the present example illustrated in FIG. 11, the project explorer window 149 displays that the project pertaining to Page1 shown on page window 144 includes Graphic1 154 thereon.

With respect to creating graphical objects 52, a user can create a graphical object by performing a group function 61 (FIG. 4), as previously discussed, on an existing shape, control, symbol or other graphic. Accordingly, a graphical object 52 could be an imported bitmap, symbol or even an existing control object. As soon as the grouping function is applied, it becomes a graphical object 52 and inherits the properties, methods and events of that object. Accordingly, to perform the grouping function of FIG. 4 using interface 140 of FIG. 11, the user would select the shapes to be grouped and then actuate the group function within the application menu. Some graphics, such as the preformed graphical objects 158 from library 156 previously discussed, automatically become a graphical object as soon as they are dropped onto the page window 144. Once grouped, the individual shapes of the graphic object become joined as a single object. Accordingly, dragging or otherwise moving the graphical object, as later described, will automatically move the individual shapes of the graphical object so that the graphical object retains its original form with respect to the relationships between the individual shapes.

Figure 12:
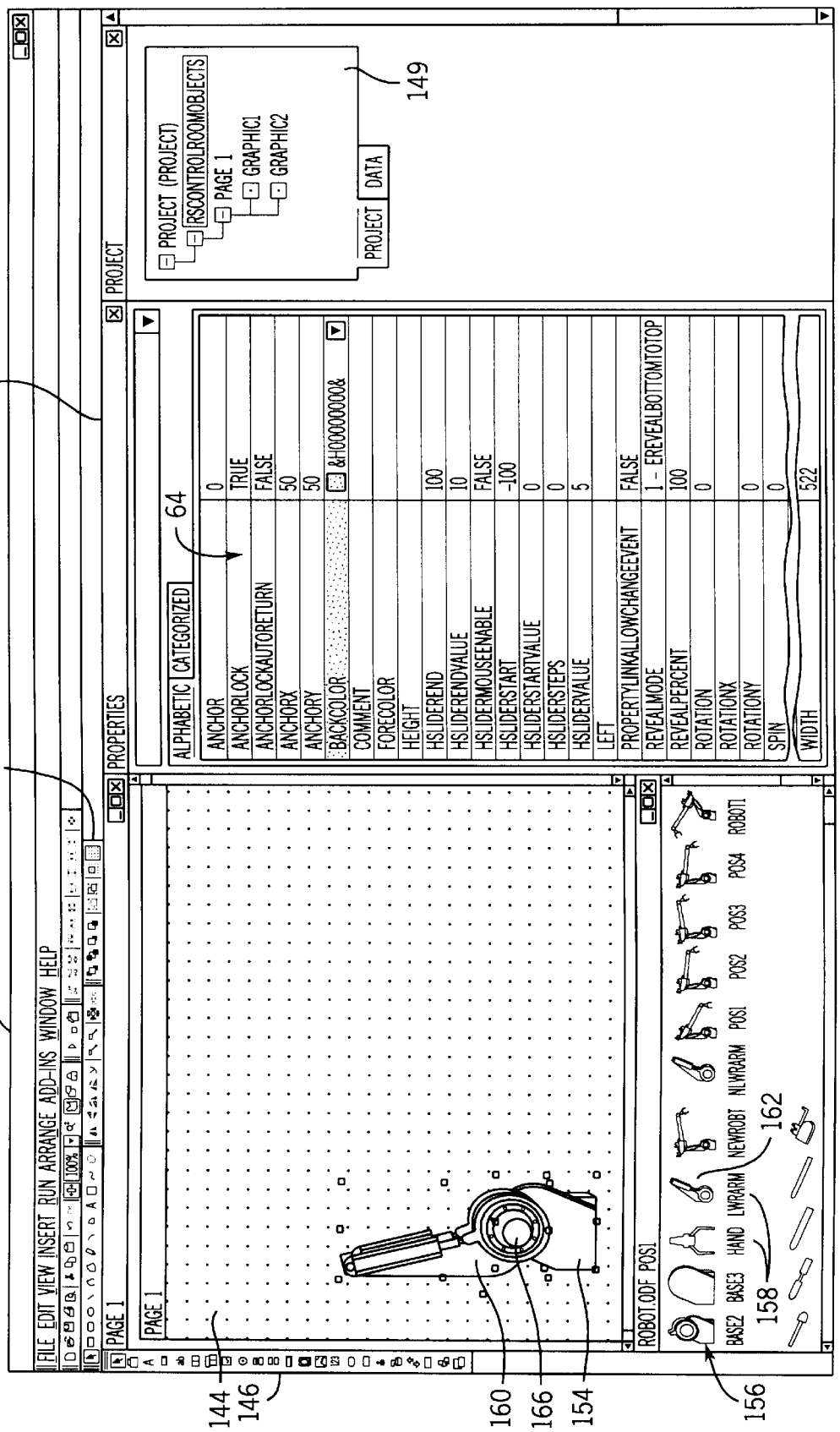

Referring now to FIG. 12, a second graphical object 52, Graphic2 160, has been added to page window 144. In this exemplary embodiment, Graphic2 160 was placed on the page window 144, similar to Graphic1 154, by accessing the library 156 and selecting one of said preformed graphical objects 158. In this case, object Lwrarm 162, which forms the basis of Graphic2 160, was selected by the user from the library 156 and dragged and dropped with the pointing device or mouse 36 (FIG. 1) on page window 144 in a desired location and orientation relative to the other graphical object, Graphic1 154.

In this particular example, Graphic2 160 is a lower arm of a robot device and in the physical sense would be mounted to pivot about the base, represented here as GraphicI 154. Accordingly, Graphic2 is positioned on GraphicI to represent the known physical device. Next, the two graphical objects must be anchored together. Basically, anchoring allows the application to keep the two objects together so that one object can be moved about another.

In one preferred embodiment, anchoring involves selecting both objects in an appropriate order to designate which object is being anchored to the other. Next, the anchoring function is actuated, such as by clicking the anchor icon 164 on the toolbar 142, as shown in FIG. 12. Once clicked, from an externally displayed user interface standpoint, the objects have been anchored. Internally, the container application 24 will implement the previously discussed anchor partner functionality. Once anchored, an anchor point is created which designates the pivot point corresponding to how the objects will move relative to one another. Referring back to FIG. 12, the anchor point between anchored objects 154, 160 is illustrated graphically as anchor point 166. The anchor point 166 belongs to object 160, the object that is anchored to another, so that anchor point can be changed through the properties of that corresponding object, as discussed below.

In a preferred embodiment, the anchor point can be changed at design time or at runtime. At design time, the anchor point is changed by changing the value of the horizontal distance by the AnchorX property or the value of the vertical distance by the AnchorY. The AnchorX and AnchorY properties were previously discussed and may be modified directly by the user during design time through access to the properties window 148 for each respective object. Alternatively, by clicking and dragging the anchor point 166 with the mouse 36, the AnchorX and AnchorY properties can be automatically changed. At runtime, the anchor point can be changed by setting the value of the AnchorX or AnchorY properties to a numbered value or to the value of another property.

Figure 13:
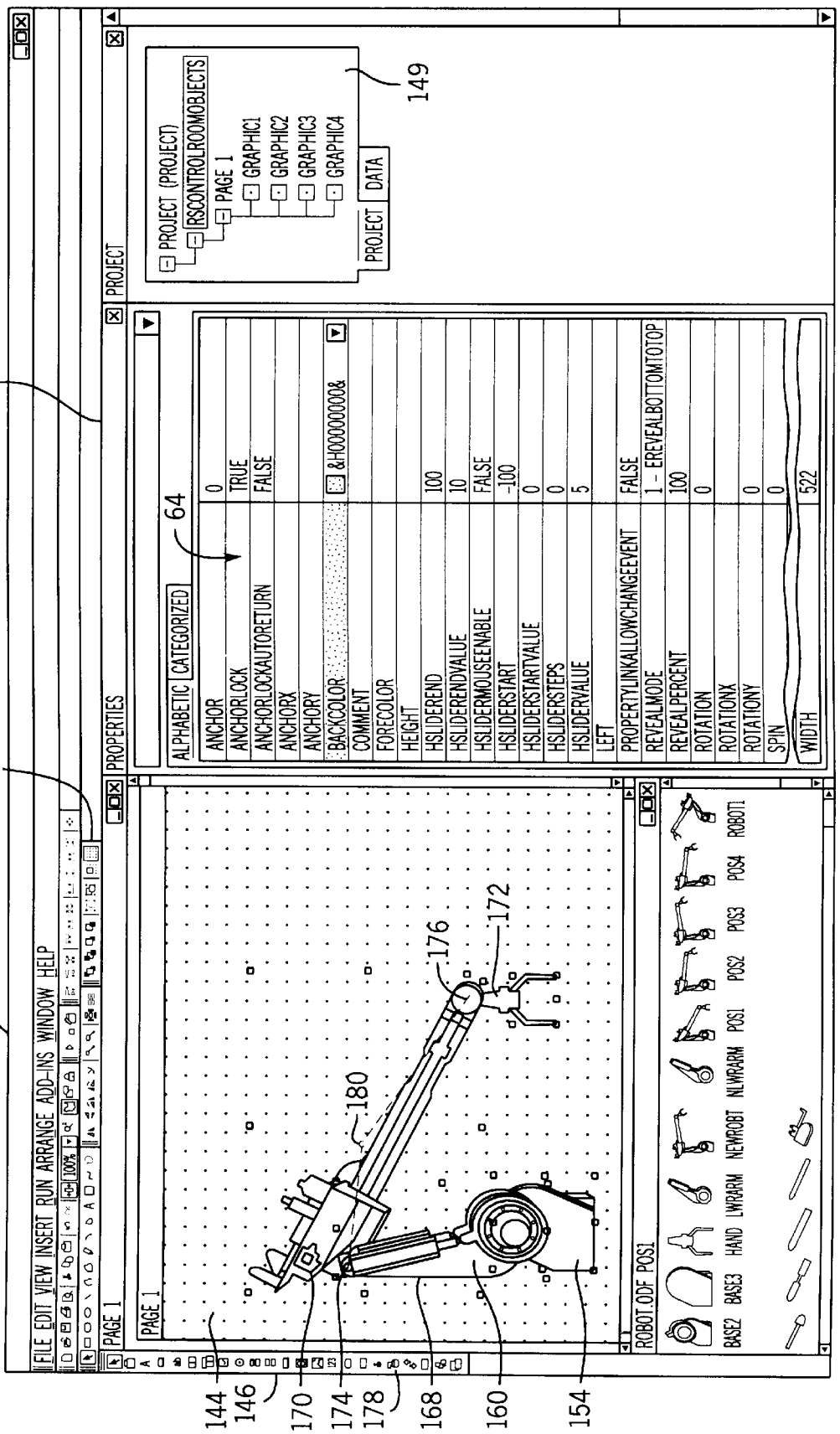

Referring to FIG. 13, an exemplary embodiment of a robotic device 168 has been constructed by adding objects Graphic3 170 and Graphic4 172 in manner similar to objects 154, 160 discussed above. In particular, Graphic3 170 has been anchored to Graphic2 160 and has an anchor point 174 corresponding thereto. Graphic4 172 has been anchored to Graphic3 170 and has an anchor point 176 corresponding thereto. It should be understood that the anchoring of objects for movement relative to one another could be applied in numerous applications including machines, such as the robotic device of this exemplary embodiment, automated processes or systems, or any other application where two more objects are displayed such that one of the objects moves relative to another one of the objects.

Once the graphical objects have been anchored to one another, one can apply the necessary code or use the appropriate controls to move one of those objects at runtime. For example, a slider tool from the toolbox 146 represented by the slider icon 178 (FIG. 13) can be configured to control one of said objects. The slider tool per se could be one such as the RSSlider tool from the RSTools program previously mentioned. The slider tool comprises a slider object, for example RSSlider1, the graphical representation of which resembles a slider switch. By adding code to RSSlider1, the value of the Anchor property of one of the graphical objects could be tied to the value between StartValue and EndValue properties of the RSSlider1 object. Example code for a subroutine of RSSlider1 to achieve the foregoing is as follows:

```
Private Sub RSSlider1_Change(ByVal Value As Double,
    Graphic2.Anchor = Value
End Sub
```

Accordingly, during runtime, movement of the graphical slider switch by the user with the mouse 36 will change the value of the RSSlider1 object, which will correspondingly change the Anchor property of Graphic2 . Since, as previously described, the Anchor property relates to the angle that an object can move relative to its anchor point, Graphic2 will pivot from its anchor point 166 from Graphic1 relative to the change of the RSSlider1. Further, any other objects anchored to Graphic2 , will move with Graphic2 . However, whether these other anchored objects maintain their original angle while rotating with its parent object will depend on the setting of the AnchorLock property which was previously described. While the foregoing illustrates one way to move an object, it will be appreciated that using controls from RSTools or Visual Basic, for example, one can apply other mechanical emulation techniques to these objects. Further, the values of the properties of the graphical objects can be tied to other components or even physical objects associated with the graphical objects through the server 44 to provide real-time mechanical emulation, as previously discussed.

In the preferred embodiment described above, the rotation point of an object can also be changed at design time or at runtime. The rotation point of an object represents the location around which an object is rotated. At design time or runtime, the rotation point can be changed by changing the value of the horizontal distance by the RotationX property or the value of the vertical distance by the RotationY property. These properties were previously discussed and may be modified directly by the user during design time through access to the properties window 148 for each respective object. Alternatively, by clicking and dragging the rotation point with the mouse 36, the RotationX and RotationY properties can be automatically changed. In the exemplary embodiment of the robotic device shown in FIG. 13, the rotation point of Graphic3 is shown for illustrative purposes as point 180. However, it should be appreciated that in this embodiment, each object would have a rotation point that could be graphically represented. At runtime, the rotation point can be changed by setting the value of the RotationX or RotationY properties to a numbered value or to the value of another property. Further, the Rotation property of each object may be changed at design time or runtime as similarly described.

Figure 14:
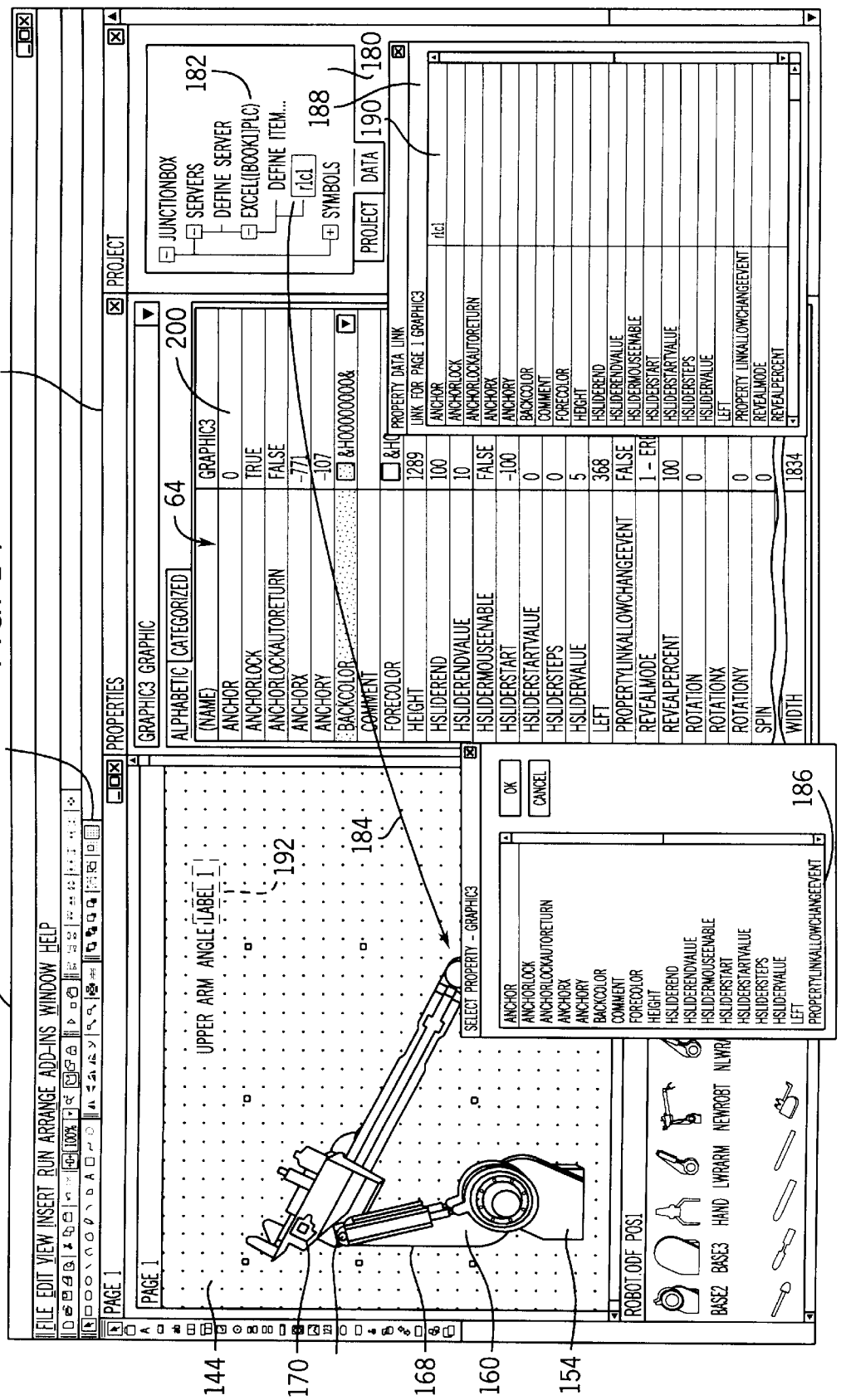

One can also apply the necessary code or server association to rotate an object at runtime, similar to the Anchor controls previously described. As previously described and illustrated in FIG. 8, the server 44 can be used to update the values of graphical object properties. Referring to FIG. 14, one preferred embodiment of utilizing the server 44 through the user interface 140 is disclosed. FIG. 14 further utilizes the exemplary embodiment of the robotic device 168, however, it should be understood that the underlining technique of linking server variables to particular graphical objects could be accomplished in a variety of forms and with any configuration of graphical objects.

Interface 140 includes a server window 180 linked to the server 44 (FIG. 8). Defined servers are listed in the server window 180 to facilitate the data linking process by the user. In the embodiment of FIG. 14, server window 180 includes an excel link 182 having a data address r1c1, which, for example, could relate to a particular memory address from a remote device such as a PLC. In the illustrated embodiment of interface 140, the data address r1c1 can be linked to a graphical object by dragging and dropping the data address r1c1 on the graphical object. In the present example, line 184 illustrates address r1c1 being dragged and dropped with the mouse onto Graphic3. Once dropped, a select property window 186 prompts the user to select the property of the object to be linked. In the present example, the Anchor property has been selected for illustrative purposes. A property datalink window 188 designates that the Anchor property for Graphic1 is linked to r1c1 in block 190. In this present example, Graphic3 is the upper arm of the robotic device 168. The angle of Graphic3 from Graphic2 is thereby determined by its Anchor property and is displayed in text block 192 where Label1 is associated with the excel link 182.

Figure 15:
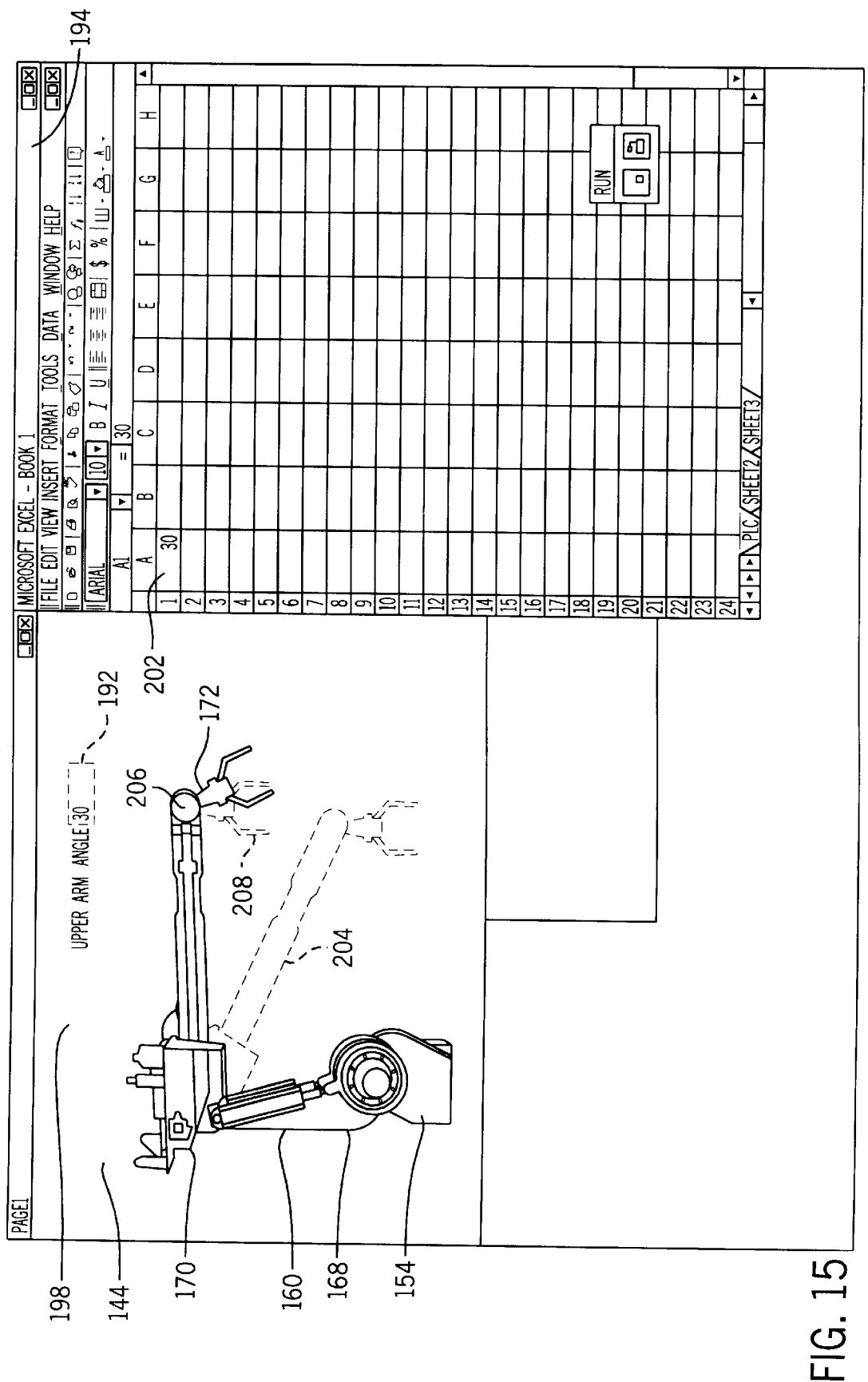

Referring to FIG. 15, a Microsoft Excel application 194 produced by the Microsoft Corporation of Redmond, Washington, has been executed. The excel link 182, shown as data link 196 in FIG. 8, is tied to this Excel application 194, except the Excel application 194 serves as the server 44, illustrated here as DDESERVER 44. Since the Excel application 194 uses the DDE, it is being used in this exemplary embodiment to illustrate an application of the server 44. However, it should be understood, as previously described, that the present invention could utilize any one of a number of server protocols or applications including RSLinx™ OPC™ or other data transmission methods. Further, it should be understood that the application and use of a server as described herein, such as the DDESERVER 44, includes any necessary kernel process which manages the resources for the server and completes any interprocess communication that is necessary.

During execution of Page 1 from the container application 24 (FIG. 3), a runtime window 198 is displayed showing the graphical objects, which were previously configured and anchored, and moving the graphical objects in accordance with updates of values of any properties of the objects. In the present exemplary embodiment, the Anchor property of Graphic3 originally had a value of 0, as shown in block 200 of FIG. 14. During execution, Label1 of the Excel application 194, shown in block 202 of FIG. 15, has been updated to a value of 30. Accordingly, through the DDE and data link process previously described, the Anchor property of Graphic3 has been updated to a value of 30, as also shown in the text block 192. Accordingly, Graphic3 has moved 30 degrees from its original position designated at position 204.

Since Graphic3 has pivoted from its anchor point 174 (FIG. 13) with Graphic2, Graphic1 and Graphic2 have remained in their original positions. However, where Graphic4 is anchored to Graphic3, Graphic4 has moved with Graphic3. Since the AnchorLock property of Graphic4 was set to true, Graphic4 has maintained its original angled relationship with Graphic3 through their connection at anchor point 176 (FIG. 13). Since at runtime, the various design time graphical representations of anchor points are not typically needed, anchor point 176 is represented in FIG. 15 at position 206 for reference purposes only. If on the other hand, the AnchorLock property of Graphic4 had been set to false, Graphic4 would have moved with Graphic3 since these objects are anchored to one another. However, Graphic4 would not have maintained the same angled relationship with Graphic3. Instead, Graphic4 would remain in a similar orientation represented generally at position 208.

Through the foregoing example, the mechanical emulation created by the graphical objects can be appreciated. Further, for example, the robotic device 168 could be constructed based on a physical robotic device where the server would then update the robotic device 168 in accordance with all movements of the various components of the physical robotic device where each of the various components are associated with particular graphical objects of the device 168 being represented. Alternatively, since the server can both read or write updates, the reader should appreciate that the graphical objects could equally be used to control an external device or process where the flow of data is simply reversed, as illustrated by the dual data flow representation of network 42 in FIGS. 1 and 8, to allow the server to write data updates across the network to a receiving location. In this case, manipulation of the graphical objects will cause the changed values of the properties to be sent from the server to control the linked components or devices. Additionally, in some applications, the container application 24 may be limited to only displaying the graphical objects in a runtime mode where such a display will serve to monitor or control the particular application that has been modeled.

Accordingly, it can be seen that the method for joining graphical objects displayed on the graphical window of the display screen of the present invention allows movement of one of the graphical objects to correspondingly move another one of the graphical objects joined or anchored therewith. In the preferred method or system, the computer system is operated in an object-oriented environment. First and second graphical objects are provided with a representation of them being dragged in the graphical window in response to position commands from a user interface coupled with the computer system to position the representations in a desired orientation relative to one another. The first and second graphical objects are operatively joined or anchored at an anchor point. Each graphical object has an anchor property corresponding to the graphical object's position relative to its anchor point.

The method or system of graphically monitoring an automated process having a plurality of different types of computer-monitored or physical components can be summarized in one preferred embodiment by the following. First and second graphical objects are provided and operatively connected to one another such that movement of a representation of one of the graphical objects on the display screen correspondingly affects the movement of the other representation. Each of the first and second graphical objects are associated or linked with one of the plurality of different types of computer-monitored components. Data is received from the automated process where the data represents position or state changes of the computer-monitored components.

In another embodiment, the graphical objects are selected from a library database. Further, the representations of the selected objects may have a graphical shape corresponding to physical attributes or a general appearance of the computer-monitored components. Where the system is to provide mechanical emulation for user display or control purposes, during design time the user will determine a relationship between the two computer-monitored components or sub-components thereof based on a physical proximity factor and a physical connection factor. The physical proximity factor corresponds to distance or orientation between the components or the lapped relationship between. The physical connection factor relates to the manner of mechanical connection, such as a pivot point. These relationships may be inherently known by the user, obtained from visual or measured inspection of the components by the user, or among other ways, obtained from review of the component's specifications. Accordingly, once the first and second graphical objects have been created or retrieved, their representations may be graphically displaying on the display device with the physical proximity factor being represented with the orientation of the representations of the first and second graphical objects relative to one another. In some cases this may require positioning the graphical objects in lapped relationship. The physical connection factor is represented with positioning and implementing an anchor point through the anchoring process, as previously discussed, which serves to operatively connect the representations of the first and second graphical objects from that point, as well as provide a pivot point, if desired.

The physical components may correspond to actual physical components that the user may examine. Alternatively, the physical components may relate to known components having known relationships with one another or may relate only exist in a virtual sense in a proposed design to be modeled or simulated with graphical objects of the present invention.

Referring back to the previous discussion where data is received from the automated process, predetermined properties of the first and second graphical objects are then updated with the data. These properties are predetermined in the preferred embodiment by nature of their association in the data linking process. The representations of the first and second graphical objects are displayed and then moved in response to updating the predetermined properties with the data as it is received.

With respect to the use of the term "automated process," it should be noted that this term used herein refers to those processes or system that are automated with respect to the general meaning of the term, as well as those systems that are automated through the use of some network or computer sharing or distribution of information, but not to say that all human observation, effort, or decision making has been eliminated. For example, a factory automation process may include a conveyor system or production line having a series of workstations. A user display for monitoring the factory automation process may have being configured in accordance with the teachings of the present invention where components of the process are represented and linked with graphical objects. However, the fact that some workstations or aspects of the process are not completely automated in the system does not prevent the ability of the user display from representing some of the process or its state of present operation through mechanical emulation of the accessible components of the process.

Although the invention has been described by reference to some embodiments it is not intended that the novel device be limited thereby, but that modifications thereof are intended to be included as falling within the broad scope and spirit of the foregoing disclosure, the following claims and the appended drawings.

We claim:

1. A method for joining graphical objects displayed on a graphical window of a display screen of a computer system so that movement of one of said graphical objects will correspondingly move another one of said graphical objects joined therewith, said method comprising:

operating the computer system in an object-oriented environment;

providing a server operatively connected with the computer system and adapted to communicate data across a network;

providing first and second graphical objects;

dragging a representation of the first graphical object in the graphical window in response to position commands from a user interface coupled with the computer system to position the representation of the first graphical object in the graphical window in a desired orientation;

dragging a representation of the second graphical object in the graphical window in response to position commands from the user interface to position the representation of the second graphical object in the graphical window in a desired orientation relative to the position of the representation of the first graphical object, said steps of dragging the representations of the respective first and second graphical objects occurring in a design state;

operatively joining said first and second graphical objects at an anchor point, wherein one of the graphical objects has an anchor property corresponding to the graphical object's position relative to the anchor point;

communicating across the network with the server to automatically, without user interaction, receive data from an automated component where such data corresponds to a position change of one said graphical objects; and moving one of said graphical objects in response to its receipt during a runtime state of said data corresponding to a position change and correspondingly moving another one of said graphical objects joined therewith.

2. The method of claim 1, wherein each of the first and second graphical objects has a rotation point and a rotation property, the rotation property corresponding to the graphical object's rotational position relative to the rotation point.

3. The method of claim 2, wherein the rotation property has a value in the range of 0–360 degrees.

4. The method of claim 1, wherein the anchor property has a value in the range of 0–360 degrees.

5. The method of claim 2, wherein the rotation point and anchor point are adjustable by a user during design time and run time.

6. The method of claim 2, wherein said one of the first and second graphical objects has an anchorX and anchorY property, the anchorX property corresponding to a horizontal position component of the anchor point, and the anchorY property corresponding to a vertical position component of the anchor point.

7. A method of operatively joining graphical objects graphically displayed on a computer display device of a computer system which includes the computer display device, a processor, and memory, the method comprising:
   providing first and second graphical objects and storing the graphical objects in the memory of the computer system;
   joining the first and second graphical objects to one another such that movement of a representation of one of said first and second graphical objects on the display device correspondingly affects the movement of a representation of another one of said first and second graphical objects; and
   moving the representation of one of the first and second graphical objects on the display device in response to a value change of a property of said one of the first and second graphical objects, the value change of the property being automatically, without user interaction, communicated from an automated component across a network and received by the computer system, the property being associated with positioning of the representation of said one of the first and second graphical objects on the display screen, and automatically moving the representation of the other one of the first and second graphical objects joined therewith so that the representations of the first and second graphical objects emulate a mechanical connection of the representations.

8. The method of claim 7, wherein one of the graphical objects includes an anchor property, a value of the anchor property corresponding to the relative pivotal position of said one of the graphical objects to an anchor point of said one of the graphical objects associated with the joining of the graphical objects to one another.

9. A method of operatively joining two or more graphical objects graphically displayed on a computer display device of a computer system which includes the computer display device, a processor, and memory, the method comprising the steps of:
   determining a relationship between two physical components based on a physical proximity factor and a physical connection factor;
   providing first and second graphical objects in an object-oriented environment and storing the graphical objects in the memory of the computer system;
   graphically display representation of the first and second graphical objects on the display device;
   enabling a user to adjust the orientation of the representation of the first and second graphical objects relative to one another during a design state by operating a pointer device operatively connected to the computer system so that the orientation of the representations of the first and second graphical objects graphically represents the physical proximity factor;
   enabling a user to selectively position an anchor point of one of the first and second graphical objects on the display device by operating a pointer device so that the anchor point graphically corresponds to the physical connection factor of the two physical components relative to the representations of the first and second graphical objects;
   effectuating a change of value in properties of said one of the first and second graphical objects that represent the position of the anchor point relative to the representation of said one of the first and second graphical objects based on the selected position of the anchor point by the user;
   communicating data across a network connected with the computer system via a server automatically, without user interaction, to receive data from an automated component where such data corresponds to a position change of one of said graphical objects; and
   moving one of said graphical objects during a runtime state in response to its receipt of said data corresponding to a position change and correspondingly moving another one of said graphical objects through its pivotal connection through the anchor point.

10. The method of claim 9, wherein said one of the first and second graphical objects includes an anchor property, a value of the anchor property corresponding to the relative pivotal position of said graphical object on its anchor point.

11. The method of claim 10, wherein the value of the anchor property is in the range of 0 to 360 degrees.

12. The method of claim 9, wherein the first and second graphical objects are each comprised of a plurality of other similarly configured graphical objects operatively connected together.

13. The method of claim 9, wherein the first and second graphical objects are each comprised of a plurality of other similarly configured graphical objects operatively connected together.

14. A computer system, comprising:
   a computer having a process;
   a memory operatively coupled to the computer;
   first and second graphical objects stored within the memory of the computer, the first and second graphical objects having at least one property corresponding to the position of a representation of the respective graphical object;
   the first and second graphical objects being anchored together so that movement of a representation of one of the first and second graphical objects correspondingly moves a representation of the other one of the first and second graphical objects as either of the first and second graphical objects receive data automatically, without user interaction, across a network from a remote automated component that updates during runtime a value of the property from the data corresponding to the position of such graphical object; and
   a display screen, operatively coupled to the memory, for graphically displaying the representations of the first and second graphical objects.

15. The computer system of claim 14, wherein the first and second graphical objects have an anchor point corresponding to a graphical connection between the representations of the first and second graphical objects.

16. The computer system of claim 15, further comprising:
a user interface, operatively coupled to the display screen, for dragging, in response to commands issued by the user, the graphically displayed representations of the graphical objects, and for dropping, in response to commands issued by the user, the graphically displayed representations of the graphical objects in a desired orientation relative to one another and for dragging, in response to commands issued by the user, the anchor point of the graphical objects, and for dropping, in response to commands issued by the user, the anchor point in a desired position to graphically represent the position of the connection between the representations of the graphical objects; and means, operatively coupled to the memory, in response to commands issued by the user from said user interface, for altering a value of an anchor position property of one of said pair of graphical objects corresponding to the desired position of the anchor point.

17. A method for joining graphical objects displayed on a graphical window of a display screen of a computer system so that movement of one of said graphical objects will correspondingly move another one of said graphical objects joined therewith, said method comprising the steps of:

providing first and second graphical objects;

dragging a representation of the first graphical object in the graphical window in response to position commands from a user interface coupled with the computer system to position the representation of the first graphical object in the graphical window in a desired orientation;

dragging a representation of the second graphical object in the graphical window in response to position commands from the user interface to position the representation of the second graphical object in the graphical window in a desired orientation relative to the position of the representation of the first graphical object, said steps of dragging the representations of the respective first and second graphical objects occurring in a design state;

operatively joining said first and second graphical objects to one another;

automatically, without user interaction, receiving data communicated across a network to the computer system from an automated component during a runtime state to update a position property value of one of the graphical objects, the data corresponding to a position change of one of the first and second graphical objects; and moving one of the first and second graphical objects based on the received data and updated position property value and correspondingly moving another one of the first and second graphical objects joined therewith.

18. A computer system, comprising:

a computer having a processor;

a memory operatively coupled to the computer;

first and second graphical objects stored within the memory of the computer, the first and second graphical objects having at least one property corresponding to the position of a representation of the respective graphical object, the first and second graphical objects operatively connected together so that movement of a representation of one of the first and second graphical objects correspondingly moves a representation of the other one of the first and second graphical objects as one of the first and second graphical objects automatically, without user interaction, receive data communicated across a network from an automated component connected to the network for updating during runtime a value of the property from the data corresponding to the position of such graphical object; and a display screen, connected to the computer, for graphically displaying the representations of the first and second graphical objects.

19. The computer system of claim 18, wherein the first and second graphical objects reside within a container application operating with the computer and data received from the network is received via server operatively connected with the container application.

20. The computer system of claim 19, wherein the server operates independently from the container application to maintain communication with the network and to facilitate the automatic updating of any changed values of properties of the graphical objects.

* * * * *